Nov. 9, 1954

P. W. ROUNDS 2,694,184

EQUALIZER

Filed March 16, 1951

INVENTOR
P. W. ROUNDS
BY
Ralph J. Holcomb
ATTORNEY

United States Patent Office

2,694,184

Patented Nov. 9, 1954

2,694,184

EQUALIZER

Philip W. Rounds, Chatham, N. J., assignor to Bell Telephone Laboratories, Incorporated, New York, N. Y., a corporation of New York

Application March 16, 1951, Serial No. 216,074

5 Claims. (Cl. 333—28)

This invention relates to wave transmission networks and more particularly to adjustable equalizers.

An object of the invention is to select a desired proportional part of the discrimination characteristic of an equalizer and at the same time adjust the attenuation level as desired. A further object is to keep the attenuation substantially constant at an arbitrarily chosen frequency as the equalizer characteristic is adjusted.

In one embodiment the equalizer in accordance with the present invention is a bridged-T structure comprising two series resistors which are ordinarily equal, an interposed shunt branch and a bridging branch. The bridging branch and the shunt branch have an impedance product which is substantially constant at all frequencies of interest and each comprises an impedance-transforming attenuator terminated in a fixed impedance. Each attenuator includes means for simultaneously changing both its attenuation and its ratio of impedance transformation. As a special case, the attenuation of the equalizer may be kept substantially constant, at an arbitrarily selected frequency, as the equalizer is adjusted to obtain various proportional parts of a desired discrimination characteristic. Each attenuator will, in general, comprise three resistors connected in a T or $\pi$ formation.

Figure 1:
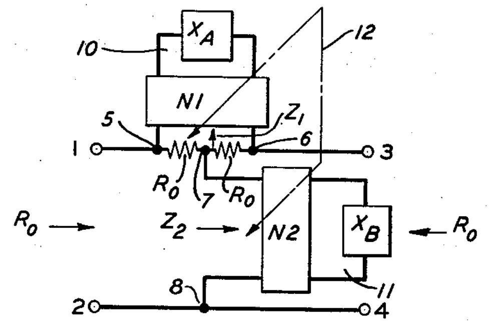
Figure 6:
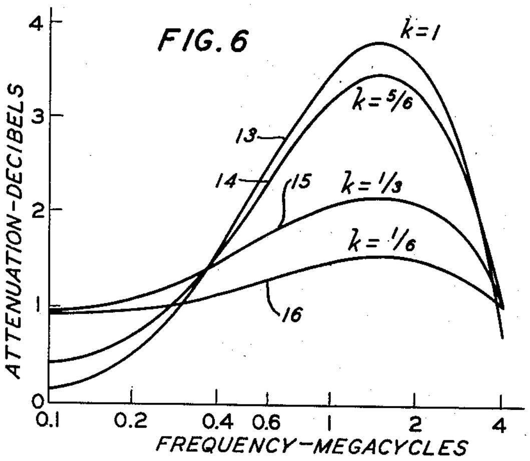
Figure 7:
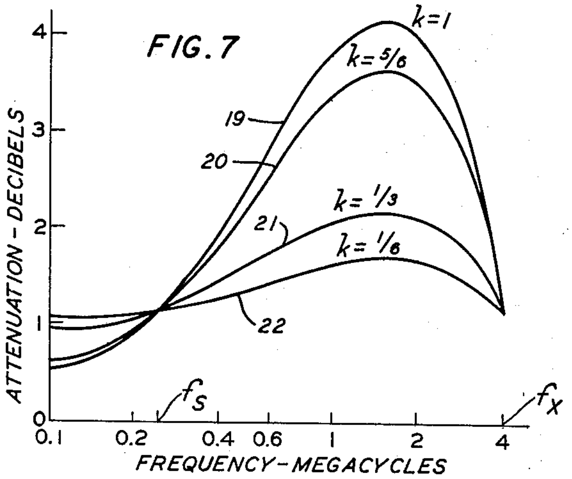
Figure 8:
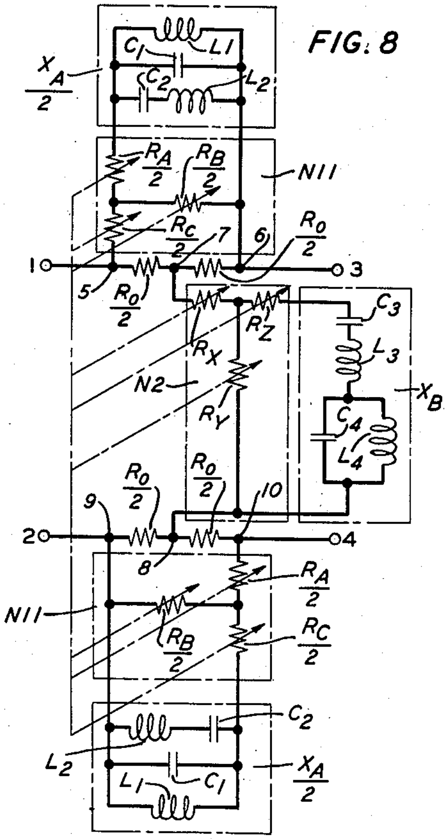

The nature of the invention will be more fully understood from the following detailed description and by reference to the accompanying drawings, of which Fig. 1 is a schematic circuit of an equalizer in accordance with the present invention in the form of an unbalanced bridged-T structure;

Figs. 2, 3, 4 and 5 show various forms of the bridging branch of the equalizer to which reference is made in explaining the theory of the invention;

Fig. 6 gives typical attenuation-frequency characteristics at three settings of an adjustable equalizer known to the prior art;

Fig. 7 gives the corresponding characteristics of an adjustable equalizer in accordance with the invention, in which the attenuation at the arbitrarily selected frequency $f_S$ remains unchanged at all settings; and Fig. 8 shows in detail the circuit of an adjustable equalizer in accordance with the invention in the form of a balanced bridged-T structure.

Taking up the figures in more detail, Fig. 1 shows one embodiment of an equalizer in accordance with the invention in the form of an unbalanced bridged-T network having a pair of input terminals 1, 2, to which a suitable source of alternating signals may be connected, and a pair of output terminals 3, 4, to which a load of suitable impedance may be connected. The network is a constant-resistance structure of the general type disclosed in United States Patent No. 1,606,817, to G. H. Stevenson, issued November 16, 1926, and, as indicated, has at each end a substantially non-reactive image impedance $R_0$ which is substantially constant with frequency throughout the operating range. It comprises two equal series resistors each of value $R_0$, a bridging branch 10 of impedance $Z_1$ connected between the outer terminals 5 and 6 thereof, and a shunt branch 11 of impedance $Z_2$ connected between the common terminal 7 of the resistors and a point 8 in the path between terminals 2 and 4. The impedance $Z_1$ comprises a four-terminal, impedance-transforming attenuator N1 terminated in a fixed impedance $X_A$, and the impedance $Z_2$ comprises another impedance-transforming attenuator N2 terminated in a second fixed impedance $X_B$. As indicated by the arrows connected by the dot-and-dash line 12, the networks N1 and N2 are adjustable and may be under unitary control. The impedances $X_A$ and $X_B$ have approximately the relationship $$X_A X_B = R_0^2 \qquad (1)$$

and the impedances $Z_1$ and $Z_2$ have approximately the relationship $$Z_1 Z_2 = R_0^2 \qquad (2)$$

at all settings of the attenuators N1 and N2. The circuit shown in Fig. 1 may, of course, be transformed into a balanced bridged-T structure of the type shown in Fig. 8, if desired.

Figure 2:
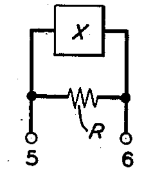

The theory underlying the invention will now be explained with the aid of Figs. 2, 3, 4 and 5 showing various bridging branches which may be connected between points 5 and 6 of the network of Fig. 1. As shown in Fig. 2, the bridging branch is first designed as the parallel combination of an impedance X and a resistance R which will provide a desired attenuation-frequency characteristic for the equalizer.

Figure 3:
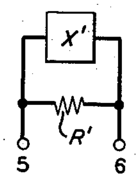

Now, a fraction (or multiple), $k$, of this characteristic can be obtained to a good approximation by substituting for X and R the impedance X′ and the resistance R′, as shown in Fig. 3, provided the following relationships obtain:

$$R' = \left[e^{kA_0} - 1\right] R_0 \qquad (3)$$

and $$X' = \left[\frac{\sinh\left(\frac{kA_0}{2}\right)}{\sinh\left(\frac{A_0}{2}\right)}\right] X \qquad (4)$$

where $$A_0 = \log_e\left(1 + \frac{R}{R_0}\right) \qquad (5)$$

and $e$ has its usual significance. If the impedance X is a pure reactance, an equalizer employing the bridging branch shown in Fig. 3 will have exactly $k$ times the attenuation of an equalizer using the branch shown in Fig. 2 at frequencies where the attenuation is zero, maximum, or half the maximum value. At other frequencies in the operating range the proportionality will not be exact, but will be closely approximated.

Figure 4:
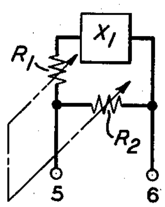

Proceeding further, the impedance X′ shown in the bridging branch of Fig. 3 may be replaced by an impedance $X_1$, and the shunt resistance R′ by an L-type attenuator comprising a series resistance $R_1$ and a shunt resistance $R_2$, as shown in Fig. 4. An equalizer with a bridging branch as shown in Fig. 4 will have the same attenuation-frequency characteristic, except for an added constant loss of $A_1$ nepers, as one with the branch shown in Fig. 3 if the following relationships are satisfied:

$$R_1 = \left[\frac{2\sinh\left(\frac{A_1}{2}\right)\sinh\left(\frac{A_1 + kA_0}{2}\right)}{\sinh\left(\frac{kA_0}{2}\right)}\right] R_0 \qquad (6)$$

$$R_2 = \left[e^{A_1 + kA_0} - 1\right] R_0 \qquad (7)$$

$$X_1 = \left[\frac{\sinh\left(\frac{A_1 + kA_0}{2}\right)}{\sinh\left(\frac{kA_0}{2}\right)}\right]^2 X' \qquad (8)$$

In particular, if the magnitude of $A_1$ is fixed by the relationship $$\sinh\left(\frac{A_1 + kA_0}{2}\right) = \left[\sinh\left(\frac{A_0}{2}\right)\sinh\left(\frac{kA_0}{2}\right)\right]^{1/2} \qquad (9)$$

then the impedance $X_1$ will be equal to X and thus any desired fraction, $k$, of the original characteristic of the equalizer employing the branch shown in Fig. 2 can be obtained (except for the added constant loss $A_1$) with the original fixed impedance X. Since any desired proportional part of the original discrimination characteristic can be realized in this manner, it is possible to obtain an adjustable equalizer through an appropriate selection or adjustment of the resistances $R_1$ and $R_2$ of Fig. 4, as indicated by the arrows, while having the impedance $X_1$ fixed. Typical attenuation-frequency characteristics thus obtainable, with values of $k$ equal to unity, 5/6, 1/3 and 1/6, are shown by the curves 13, 14, 15 and 16, respectively, in Fig. 6. In this figure, and also in Fig. 7, a logarithmic frequency scale is used.

In many applications of adjustable equalizers it is desired that the loss of the equalizer at an arbitrarily selected frequency, such as $f_S$ in Fig. 7, remain fixed for all steps in the adjustment, a feature unobtainable with equalizers of the prior art. However, in accordance with the present invention this may be accomplished by an equalizer whose bridging branch 10 has the configuration shown in Fig. 5, comprising a network N1 terminated in an impedance $X_A$. The network N1 is a four-terminal, impedance-transforming attenuator in which both the ratio of impedance transformation and the attenuation may be selected or adjusted to have the required values. At least three impedance branches are required for the network, and these may be arranged in the form of either a T or a $\pi$ structure. As shown, the network N1 is of the T-type, comprising two series resistances $R_A$ and $R_C$, with a shunt resistance $R_B$ interposed therebetween. In order to facilitate adjustment of the network, each of these resistances may be made adjustable, as indicated by the arrows, and may be placed under unitary control, as indicated by the dot-and-dash line 17.

Typical attenuation-frequency characteristics thus obtainable are shown in Fig. 7, where the curves 19, 20, 21 and 22 correspond, respectively, to a $k$ of unity, 5/6, 1/3, and 1/6 and each has the same attenuation at the arbitrarily chosen frequency $f_S$ of 0.25 megacycle. Since these characteristics are of the type having a maximum loss at a finite frequency, they will also cross at a second common frequency $f_X$, which is 4 megacycles in this case. To obtain these characteristics, a second loss of $A_2$ nepers, constant with frequency but dependent on $k$, is added to each of the characteristics of Fig. 6. The impedances shown in Fig. 5 have the following values in terms of impedances already known:

$$R_A=[e^{A_2}]R_1 \qquad (10)$$

$$R_B=[e^{A_2}]R_2 \qquad (11)$$

$$R_C=[e^{A_2}-1]R_0 \qquad (12)$$

$$X_A=[e^{A_2}]X_1 \qquad (13)$$

The value of the impedance $X_A$ as thus determined is not constant, since it depends upon $A_2$ which, in turn, varies with the value of $k$. However, it will be noted that, for equal losses $A_1$ and $A_2$, the impedance-multiplying factor in Equation 8 is much larger than the corresponding factor in Equation 13. It follows, therefore, that by a readjustment of the relative proportions of $A_1$ and $A_2$ the desired result of an invariable impedance $X_A$ with a constant loss at a selected frequency can be obtained.

The formulas giving the required losses $A_1$ and $A_2$ are quite involved, so that a method of successive approximations affords the easiest means for solving for their values. The following method is suggested. Let $f_S$ be the frequency at which it is desired to maintain a fixed loss for all values of $k$, and let $A_S$ be the loss at this frequency when $k=1$. Find $(A_1+kA_S)$ as a function of $k$, using Equation 9 to determine $A_1$. The quantity $(A_1+kA_S)$ will have a maximum for some value of $k$. If the maximum occurs when $k=1$, choose a loss $A_2$ such that the sum S, given by $$S=A_1+A_2+kA_S \qquad (14)$$

is equal to this maximum for all values of $k$. Then, for each $k$, readjust the values of $A_1$ and $A_2$ by successive approximations, keeping their sum a constant such that the overall impedance-multiplying factor is equal to unity, as given by the equation $$\left[\frac{\sinh^2\left(\frac{A_1+kA_0}{2}\right)}{\sinh\left(\frac{A_0}{2}\right)\sinh\left(\frac{kA_0}{2}\right)}\right]e^{A_2}=1 \qquad (15)$$

If, on the other hand, the maximum value of $(A_1+kA_S)$ should occur when $k<1$, this procedure would require a negative value of $A_1$, to satisfy Equation 15 when $k=1$, and an alternative procedure must be followed. Choose a trial sum S slightly higher than the maximum value of $(A_1+kA_S)$. Find $A_2$ for $k=1$, and compute $e^{A_2}$ for this case. The object is to find values of $A_1$ and $A_2$ such that the overall impedance-multiplying factor will satisfy the equation $$\left[\frac{\sinh^2\left(\frac{A_1+kA_0}{2}\right)}{\sinh\left(\frac{A_0}{2}\right)\sinh\left(\frac{kA_0}{2}\right)}\right]e^{A_2}=e^{A_{21}} \qquad (16)$$

where $A_{21}$ is the value of $A_2$ for $k=1$.

Examining first the value of $k$ which gives the maximum $(A_1+kA_S)$, it will be found that too low a choice of S will require a negative value of $A_2$ to satisfy Equation 16. Too high a choice of S will result in more added loss in the equalizer than necessary. The optimum choice is that which makes $A_2=0$ for the value of $k$ corresponding to maximum $(A_1+kA_S)$. After the appropriate value of S has been determined, Equation 16 can be satisfied for each value of $k$ by readjusting the values of $A_1$ and $A_2$ by successive approximations, keeping S fixed.

Finally, the element values may be determined using Equations 10 to 13 inclusive. In this manner the resistance values are obtained at discrete steps, $k$, in the adjustment. If the adjustment is to be continuous, intermediate values can be obtained by plotting and interpolation.

In the theory outlined, it is assumed that the fixed impedance branches comprise pure reactance networks. Although this represents the most important case in practical applications, the fixed impedance branches may comprise generalized impedances provided any equivalent parallel resistance in the branch is associated with network N1.

Figure 5:
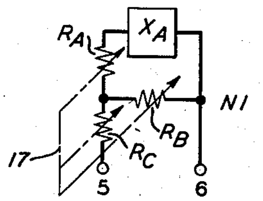

The values of all the elements of the bridging branch shown in Fig. 5 have now been determined. This branch may be used for the corresponding one shown in Fig. 1. The impedance of the branch $X_B$ is found from Equation 1. The network N2 is determined by the relationship given in Equation 2. The network N1 may, if desired, be transformed into an equivalent $\pi$ network. Likewise, the network N2 may be either of the T type or the $\pi$ type.

Fig. 8 is a schematic circuit of an equalizer in accordance with the invention in the form of a balanced bridged-T structure which will provide the characteristics shown in Fig. 7. Each of the networks N11 in the bridging branches is the same as the network N1 of Fig. 5, except that each of the resistances in N11 has only half the value of the corresponding one in N1. Each of the series resistances has a value of $R_0/2$. Each of the networks N11 is terminated in an impedance $X_A/2$ comprising three parallel arms. One of these arms is an inductance $L_1$, another is a capacitance $C_1$, and the third is made up of inductance $L_2$ and a capacitance $C_2$ in series.

The shunt impedance branch $Z_2$ comprises a network N2 terminated in an impedance $X_B$. The network N2 is a T-type structure comprising two series resistances $R_X$ and $R_Z$ and an interposed shunt resistance $R_Y$. The impedance $X_B$ comprises the parallel combination of an inductance $L_4$ and a capacitance $C_4$, in series with an inductance $L_3$ and a capacitance $C_3$.

All of the elements in the branches $X_A/2$ and $X_B$ may be fixed in value. However, provision is made for changing both the ratio of impedance transformation and the attenuation of the networks N11 and N2. This may be done by substituting resistances of the required value or, as indicated by the arrows and the connecting dot-and-dash lines, the component resistances may be made adjustable under unitary control.

To provide the characteristics shown in Fig. 7, the reactive elements of Fig. 8 will have approximately the following values when the image impedance $R_0$ is 110 ohms, the frequency $f_S$ of invariable loss is 0.25 megacycle, and $A_0$ is 0.4385 neper:

$C_1$=577 micro-microfarads
$C_2$=675 micro-microfarads
$C_3$=1338 micro-microfarads
$C_4$=293 micro-microfarads
$L_1$=8.10 microhenries
$L_2$=1.773 microhenries
$L_3$=3.492 microhenries
$L_4$=4.09 microhenries Each of the resistances $R_0/2$ has a value approximately equal to 55 ohms.

For the curve 20 of Fig. 7, corresponding to $k=5/6$, $A_1$ may be taken as 0.0395 neper and $A_2$ as 0.0213 neper. The component resistances in the networks N11 will then have approximately the following values:

$$R_A/2=1.18 \text{ ohms}$$
$$R_B/2=28.0 \text{ ohms}$$
$$R_C/2=2.46 \text{ ohms}$$

For the curves corresponding to other values of $k$, these resistances will have other values, determined as explained above, such that the loss of the equalizer at the frequencies $f_S$ and $f_X$ always remains the same.

What is claimed is:

1. An equalizer of the bridged-T type comprising two series resistors, an interposed shunt branch, and a bridging branch, said branches having an impedance product which is substantially constant at all frequencies and each comprising a four-terminal, impedance-transforming attenuator and a fixed reactive impedance connected to the output terminals of said attenuator, the input terminals of one of said attenuators being connected to the outer terminals of said resistors, an input terminal of the other of said attenuators being connected to the common terminal of said resistors, and each of said attenuators comprising three unequal resistances connected to form a ladder-type network and including means for changing the value of each of said three resistances, whereby the attenuation of the equalizer may be kept substantially constant, at an arbitrarily selected frequency, when said resistances in said attenuators are changed to obtain different proportional parts of the discrimination characteristic of the equalizer.

2. An equalizer in accordance with claim 1 in which said two series resistors are approximately equal in value.

3. An equalizer in accordance with claim 1 in which said three resistances in each of said attenuators are connected to form a T network.

4. An equalizer of the bridged-T type comprising two approximately equal resistances connected in series, a shunt branch interposed between said resistances, and a bridging branch connected between the outer terminals of said resistances, the product of the impedances of said branches being substantially constant throughout the frequency range of interest, each of said branches comprising a four-terminal, impedance-transforming attenuator and a fixed reactive impedance connected to the output terminals of said attenuator, the input terminals of one of said attenuators being connected to said outer terminals of said resistances, an input terminal of the other of said attenuators being connected to the common terminal of said resistances, and each of said attenuators comprising three unequal resistances connected to form a ladder-type network and including means for changing the values of said three resistances to other values so chosen as to provide a proportional part of the original discrimination characteristic of the equalizer throughout said range without changing the attenuation at an arbitrarily selected frequency.

5. An equalizer in accordance with claim 4 in which said three resistances in each of said attenuators are connected to form a T network.

References Cited in the file of this patent

UNITED STATES PATENTS

| Number | Name | Date |
|---|---|---|
| 1,606,817 | Stevenson | Nov. 16, 1926 |
| 2,153,743 | Darlington | Apr. 11, 1939 |
| 2,238,023 | Klipsch | Apr. 8, 1941 |
| 2,374,872 | Lundry | May 1, 1945 |